(12) United States Patent
Millman et al.

(10) Patent No.: US 8,259,435 B2
(45) Date of Patent: Sep. 4, 2012

(54) HERMETICALLY SEALED WET ELECTROLYTIC CAPACITOR

(75) Inventors: William A. Millman, Paignton (GB); Ed Jackson, Saco, ME (US); James Steven Bates, Saco, ME (US); John Galvagni, Hendersonville, NC (US)

(73) Assignee: AVX Corporation, Fountain Inn, SC (US)

( * ) Notice: Subject to any disclaimer, the term of this patent is extended or adjusted under 35 U.S.C. 154(b) by 159 days.

(21) Appl. No.: 12/916,794

(22) Filed: Nov. 1, 2010

(65) Prior Publication Data
US 2012/0106030 A1 May 3, 2012

(51) Int. Cl.
*H01G 9/10* (2006.01)
(52) U.S. Cl. ........ 361/518; 361/516; 361/517; 361/535; 361/536; 361/537
(58) Field of Classification Search .................. 361/518, 361/516–517, 519, 523–525, 528–530, 535–537, 361/540–541, 509–512; 29/25.01, 25.03
See application file for complete search history.

(56) References Cited

U.S. PATENT DOCUMENTS

| | | | |
|---|---|---|---|
| 3,476,557 A | 11/1969 | Fincham | |
| 3,600,017 A | 8/1971 | Scherer | |
| 3,809,552 A | 5/1974 | Klein | |
| 3,912,985 A | 10/1975 | Sawchuk | |
| 3,956,819 A | 5/1976 | Augeri | |
| 4,002,473 A | 1/1977 | Klein | |
| 4,025,827 A | 5/1977 | Pellerin et al. | |
| 4,044,218 A | 8/1977 | Olson et al. | |
| 4,168,351 A | 9/1979 | Taylor | |
| 4,296,458 A | 10/1981 | Smith et al. | |
| 4,479,168 A | 10/1984 | Green, Jr. | |
| 4,537,641 A | 8/1985 | Albrecht et al. | |

(Continued)

FOREIGN PATENT DOCUMENTS
GB 1256147 12/1971
(Continued)

OTHER PUBLICATIONS

Abstract of Article—Carlberg, et al., "Poly(3,4-ethylenedioxythiophene) as Electrode Material in Electrochemical Capacitors," *Journal of the Electrochemical Society*, vol. 144, Issue 4, 1997, pp. L61-L64.

(Continued)

*Primary Examiner* — Nguyen T Ha
(74) *Attorney, Agent, or Firm* — Dority & Manning, P.A.

(57) ABSTRACT

A wet electrolytic capacitor that contains a hermetically sealed lid assembly is disclosed. More specifically, the lid assembly contains a lid (e.g., titanium) that defines an internal orifice. A conductive tube may extend through the orifice that is of a size and shape sufficient to accommodate an anode lead. An insulative material is also provided within the orifice to form a hermetic seal (e.g., glass-to-metal seal), such as between the conductive tube and the lid. The lid assembly also includes a liquid seal that is formed from a sealant material. The liquid seal coats a substantial portion of the lower surface of the lid and hermetic seal to limit contact with any electrolyte that may leak from the casing. To help achieve such surface coverage, the sealant material is generally flowable so that it can be heated during production of the capacitor and flow into small crevices that would otherwise remains uncoated.

36 Claims, 7 Drawing Sheets

U.S. PATENT DOCUMENTS

| | | |
|---|---|---|
| 4,538,212 A | 8/1985 | Montgomery |
| 4,634,631 A | 1/1987 | Gazit et al. |
| 4,761,714 A | 8/1988 | Levasseur et al. |
| 4,780,797 A | 10/1988 | Libby |
| 4,987,519 A | 1/1991 | Hutchins et al. |
| 4,992,910 A | 2/1991 | Evans |
| 5,075,940 A | 12/1991 | Kuriyama et al. |
| 5,098,485 A | 3/1992 | Evans |
| 5,104,738 A | 4/1992 | Brow et al. |
| 5,136,474 A | 8/1992 | Sarangapani et al. |
| 5,236,627 A | 8/1993 | Hannecart et al. |
| 5,284,723 A | 2/1994 | Hannecart et al. |
| 5,369,547 A | 11/1994 | Evans |
| 5,400,211 A | 3/1995 | Evans |
| 5,435,874 A | 7/1995 | Takeuchi et al. |
| 5,456,878 A | 10/1995 | Tadokoro et al. |
| 5,457,862 A | 10/1995 | Sakata et al. |
| 5,469,325 A | 11/1995 | Evans |
| 5,473,503 A | 12/1995 | Sakata et al. |
| 5,543,249 A | 8/1996 | Takeuchi et al. |
| 5,559,667 A | 9/1996 | Evans |
| 5,571,640 A | 11/1996 | Takeuchi et al. |
| 5,648,302 A | 7/1997 | Brow et al. |
| 5,726,118 A | 3/1998 | Ivey et al. |
| 5,729,428 A | 3/1998 | Sakata et al. |
| 5,737,181 A | 4/1998 | Evans |
| 5,754,394 A | 5/1998 | Evans et al. |
| 5,776,632 A | 7/1998 | Honegger |
| 5,786,980 A | 7/1998 | Evans |
| 5,812,367 A | 9/1998 | Kudoh et al. |
| 5,849,031 A | 12/1998 | Martinez et al. |
| 5,858,911 A | 1/1999 | Wellen et al. |
| 5,894,403 A | 4/1999 | Shah et al. |
| 5,916,659 A | 6/1999 | Koerber et al. |
| 5,920,455 A | 7/1999 | Shah et al. |
| 5,926,362 A | 7/1999 | Muffoletto et al. |
| 5,973,913 A | 10/1999 | McEwen et al. |
| 5,982,609 A | 11/1999 | Evans |
| 6,006,133 A | 12/1999 | Lessar et al. |
| 6,008,980 A | 12/1999 | Stevenson et al. |
| 6,009,348 A | 12/1999 | Rorvick et al. |
| 6,024,914 A | 2/2000 | Yoshida |
| 6,037,077 A | 3/2000 | Nowaczyk |
| 6,042,624 A | 3/2000 | Breyen et al. |
| 6,064,563 A * | 5/2000 | Yamada et al. ............... 361/521 |
| 6,094,339 A | 7/2000 | Evans |
| 6,096,391 A | 8/2000 | Muffoletto et al. |
| 6,099,600 A | 8/2000 | Yan et al. |
| 6,110,622 A | 8/2000 | Frysz et al. |
| 6,117,195 A | 9/2000 | Honegger |
| 6,118,652 A | 9/2000 | Casby et al. |
| 6,157,531 A | 12/2000 | Breyen et al. |
| 6,184,150 B1 | 2/2001 | Yang et al. |
| 6,197,252 B1 | 3/2001 | Bishop et al. |
| 6,208,502 B1 | 3/2001 | Hudis et al. |
| 6,212,063 B1 | 4/2001 | Johnson et al. |
| 6,219,222 B1 | 4/2001 | Shah et al. |
| 6,224,985 B1 | 5/2001 | Shah et al. |
| 6,231,993 B1 | 5/2001 | Stephenson et al. |
| 6,275,729 B1 | 8/2001 | O'Phelan et al. |
| 6,322,912 B1 | 11/2001 | Fife |
| 6,332,900 B1 | 12/2001 | Muffoletto et al. |
| 6,334,879 B1 | 1/2002 | Muffoletto et al. |
| 6,385,490 B1 | 5/2002 | O'Phelan et al. |
| 6,388,866 B1 | 5/2002 | Rorvick et al. |
| 6,391,275 B1 | 5/2002 | Fife |
| 6,402,793 B1 | 6/2002 | Miltich et al. |
| 6,416,730 B1 | 7/2002 | Fife |
| 6,455,108 B1 | 9/2002 | Muffoletto et al. |
| 6,459,566 B1 | 10/2002 | Casby et al. |
| 6,461,759 B1 | 10/2002 | Miller et al. |
| 6,461,771 B1 | 10/2002 | Frysz et al. |
| 6,468,605 B2 | 10/2002 | Shah et al. |
| 6,477,037 B1 | 11/2002 | Nielsen et al. |
| 6,493,212 B1 | 12/2002 | Clarke et al. |
| 6,527,937 B2 | 3/2003 | Fife |
| 6,535,374 B2 | 3/2003 | O'Phelan et al. |
| 6,560,089 B2 | 5/2003 | Miltich et al. |
| 6,576,099 B2 | 6/2003 | Kimmel et al. |
| 6,576,524 B1 | 6/2003 | Evans et al. |
| 6,592,740 B2 | 7/2003 | Fife |
| 6,594,139 B2 | 7/2003 | Muffoletto et al. |
| 6,594,140 B1 | 7/2003 | Evans et al. |
| 6,599,580 B2 | 7/2003 | Muffoletto et al. |
| 6,603,654 B2 | 8/2003 | Rorvick et al. |
| 6,613,474 B2 | 9/2003 | Frustaci et al. |
| 6,639,787 B2 | 10/2003 | Kimmel et al. |
| 6,648,928 B2 | 11/2003 | Nielsen et al. |
| 6,652,729 B2 | 11/2003 | Melody et al. |
| 6,687,117 B2 | 2/2004 | Liu et al. |
| 6,687,118 B1 | 2/2004 | O'Phelan et al. |
| 6,707,660 B1 | 3/2004 | Evans et al. |
| 6,711,000 B2 * | 3/2004 | Takeishi et al. ............... 361/523 |
| 6,721,169 B2 | 4/2004 | Melody et al. |
| 6,721,170 B1 | 4/2004 | Evans et al. |
| 6,727,022 B2 | 4/2004 | Gan et al. |
| 6,737,490 B2 | 5/2004 | Sumi et al. |
| 6,740,420 B2 | 5/2004 | Muffoletto et al. |
| 6,743,547 B2 | 6/2004 | Gan et al. |
| 6,788,523 B1 | 9/2004 | Hossick-Schott et al. |
| 6,790,561 B2 | 9/2004 | Gan et al. |
| 6,795,729 B1 | 9/2004 | Breyen et al. |
| 6,801,424 B1 | 10/2004 | Nielsen et al. |
| 6,802,951 B2 | 10/2004 | Hossick-Schott |
| 6,805,777 B1 | 10/2004 | D'Astolfo, Jr. |
| 6,807,048 B1 | 10/2004 | Nielsen et al. |
| 6,819,544 B1 | 11/2004 | Nielsen et al. |
| 6,827,879 B2 | 12/2004 | Shinozaki et al. |
| 6,828,059 B2 | 12/2004 | Miller et al. |
| 6,842,328 B2 | 1/2005 | Schott et al. |
| 6,850,405 B1 | 2/2005 | Mileham et al. |
| 6,859,354 B2 | 2/2005 | Viste et al. |
| 6,888,717 B2 | 5/2005 | Kinard et al. |
| 6,893,777 B2 | 5/2005 | Probst |
| 6,922,330 B2 | 7/2005 | Nielsen et al. |
| 6,939,774 B2 | 9/2005 | Viste et al. |
| 6,946,220 B2 | 9/2005 | Probst et al. |
| 6,951,576 B1 | 10/2005 | Takeuchi |
| 6,952,339 B1 * | 10/2005 | Knowles ....................... 361/528 |
| 6,963,482 B2 | 11/2005 | Breyen et al. |
| 6,965,509 B2 | 11/2005 | Reynolds et al. |
| 6,965,510 B1 | 11/2005 | Liu et al. |
| 6,967,828 B2 | 11/2005 | Miltich et al. |
| 6,985,352 B2 | 1/2006 | Norton |
| 6,987,663 B2 | 1/2006 | Merker et al. |
| 6,995,971 B2 | 2/2006 | Norton et al. |
| 7,000,297 B2 | 2/2006 | Frustaci et al. |
| 7,002,790 B2 | 2/2006 | Hossick-Schott et al. |
| 7,012,799 B2 | 3/2006 | Muffoletto et al. |
| 7,038,901 B2 | 5/2006 | Muffoletto et al. |
| 7,072,171 B1 | 7/2006 | Muffoletto et al. |
| 7,079,377 B2 | 7/2006 | Schott et al. |
| 7,081,141 B2 | 7/2006 | Hossick-Schott et al. |
| 7,085,126 B2 | 8/2006 | Muffoletto et al. |
| 7,092,242 B1 | 8/2006 | Gloss et al. |
| 7,099,143 B1 | 8/2006 | Fife et al. |
| 7,110,240 B2 | 9/2006 | Breyen et al. |
| 7,116,547 B2 | 10/2006 | Seitz et al. |
| 7,168,142 B2 | 1/2007 | Nowaczyk |
| 7,177,140 B2 | 2/2007 | Clarke et al. |
| 7,206,186 B1 | 4/2007 | Knight et al. |
| 7,220,397 B2 | 5/2007 | Kimmel et al. |
| 7,224,576 B2 | 5/2007 | Hossick-Schott |
| 7,242,572 B2 | 7/2007 | Norton et al. |
| 7,244,279 B2 | 7/2007 | Seitz et al. |
| 7,256,982 B2 | 8/2007 | Lessner et al. |
| 7,271,994 B2 | 9/2007 | Stemen et al. |
| 7,274,551 B1 | 9/2007 | Parler, Jr. et al. |
| 7,286,336 B2 | 10/2007 | Liu et al. |
| 7,301,754 B1 | 11/2007 | Knowles |
| 7,314,685 B2 | 1/2008 | Brown et al. |
| 7,324,329 B2 | 1/2008 | Dweik et al. |
| 7,330,347 B2 | 2/2008 | Clasen et al. |
| 7,341,705 B2 | 3/2008 | Schnitter |
| 7,342,774 B2 | 3/2008 | Hossick-Schott et al. |
| 7,375,949 B2 | 5/2008 | Barr et al. |
| 7,381,396 B2 | 6/2008 | Thomas et al. |

| | | | |
|---|---|---|---|
| 7,402,183 B1 | 7/2008 | Jiang | |
| 7,419,926 B2 | 9/2008 | Schnitter et al. | |
| 7,456,073 B2 | 11/2008 | Fife et al. | |
| 7,474,521 B2 | 1/2009 | Hossick-Schott | |
| 7,480,130 B2 | 1/2009 | Fife et al. | |
| 7,483,260 B2 | 1/2009 | Ziarniak et al. | |
| 7,499,260 B2 | 3/2009 | Schott et al. | |
| 7,511,943 B2 | 3/2009 | Fife et al. | |
| 7,515,396 B2 | 4/2009 | Biler | |
| 7,544,218 B2 | 6/2009 | Norton et al. | |
| 7,555,339 B2 | 6/2009 | Nielsen et al. | |
| 7,589,956 B2 | 9/2009 | Norton et al. | |
| 7,667,954 B2 | 2/2010 | Lessner et al. | |
| 7,684,171 B2 | 3/2010 | Rorvick et al. | |
| 7,687,102 B2 | 3/2010 | Hossick-Schott et al. | |
| 7,706,126 B2 * | 4/2010 | Huang | 361/502 |
| 7,710,713 B2 | 5/2010 | Restorff et al. | |
| 7,722,683 B2 | 5/2010 | Doffing et al. | |
| 7,727,372 B2 | 6/2010 | Liu et al. | |
| 7,773,367 B1 * | 8/2010 | Knowles | 361/529 |
| 7,813,107 B1 | 10/2010 | Druding et al. | |
| 7,837,743 B2 | 11/2010 | Gaffney et al. | |
| 2004/0240152 A1 | 12/2004 | Schott et al. | |
| 2004/0243183 A1 | 12/2004 | Norton et al. | |
| 2005/0002147 A1 | 1/2005 | Nielsen et al. | |
| 2005/0089711 A1 | 4/2005 | Hossick-Schott | |
| 2005/0131509 A1 | 6/2005 | Atanassoska et al. | |
| 2006/0028786 A1 | 2/2006 | Norton et al. | |
| 2006/0091020 A1 | 5/2006 | Hossick-Schott et al. | |
| 2006/0191796 A1 | 8/2006 | Muffoletto et al. | |
| 2007/0025063 A1 | 2/2007 | Viste et al. | |
| 2007/0201186 A1 | 8/2007 | Norton et al. | |
| 2007/0221507 A1 | 9/2007 | Liu et al. | |
| 2008/0007894 A1 | 1/2008 | Seitz et al. | |
| 2008/0013257 A1 | 1/2008 | Seitz et al. | |
| 2008/0085451 A1 | 4/2008 | Freitag et al. | |
| 2008/0229565 A1 | 9/2008 | Schott et al. | |
| 2009/0035652 A1 | 2/2009 | Freitag et al. | |
| 2009/0081552 A1 | 3/2009 | Shah et al. | |
| 2009/0117457 A1 | 5/2009 | Davis et al. | |
| 2009/0125089 A1 | 5/2009 | Bischoff et al. | |
| 2009/0193637 A1 | 8/2009 | McCracken et al. | |
| 2009/0279232 A1 | 11/2009 | Druding et al. | |
| 2010/0067174 A1 | 3/2010 | Ning | |
| 2010/0142124 A1 | 6/2010 | Dreissig et al. | |
| 2010/0238608 A1 | 9/2010 | Dreissig et al. | |
| 2010/0268292 A1 | 10/2010 | Eidelman et al. | |
| 2010/0284124 A1 | 11/2010 | Iyer | |
| 2010/0302709 A1 | 12/2010 | Dreissig et al. | |
| 2010/0326967 A1 | 12/2010 | Freitag et al. | |

FOREIGN PATENT DOCUMENTS

| | | |
|---|---|---|
| JP | 3004512 A | 1/1991 |
| JP | 2001110685 A | 4/2001 |

OTHER PUBLICATIONS

Article—Groenendaal et al., "Poly(3,4-ethylenedioxythiophene) and Its Derivatives: Past, Present and Future," *Advanced Materials*, Dec. 27, 1999, 14 pages.

Article—Naoi et al., "Advanced Polymers as Active Materials and Electrolytes for Electrochemical Capacitors and Hybrid Capacity Systems," *The Electrochemical Society Interface*, Spring 2008, 5 pages.

Product Information from H.C. Starck on BAYTRON® P—Conductive Polymer Products, Baytronics, 2006, 3 pages.

Product Information from SinoDevices for Tantalum Products, 2009, 4 pages, www.sinodevices.com.

Paper—Wet Electrolyte Tantalum Capacitors from Vishay, Sep. 1, 2003, 4 pages, www.vishay.com.

Paper—Wet Tantalum Capacitors Sintered Mode TANTALEX® Capacitors For Operation to + 125 °C, Elastomer-Sealed from Vishay, Jun. 19, 2007, 5 pages, www.vishay.com.

Paper—Guide to prepare In-Situ-PEDT-Layers from H.C. Starck, 2008, 2 pages.

Paper—Aldissi et al., "Conducting Polymers in Ultracapacitor Applications," Presented at Conference Proceedings at ANTEC '98, Atlanta, Georgia, Apr. 26-Apr. 30, 1998, 6 pages.

Paper—Cespiva et al., "Tantalum Hybrid® Capacitors—The Capacitors with the Highest Available Power Density in Medium Voltage Range," Dec. 2009, 15 pages.

Paper—Edson et al., "Electrical Properties of a Novel High CV Wet Tantalum Capacitor System," CARTS USA Mar. 30-Apr. 2, 2009, Jacksonville, Florida, 11 pages.

Paper—Ennis et al., "Recent Advances in High Voltage, High Energy Capacitor Technology," General Atomics Energy Products Engineering Bulletin, $16^{th}$ IEEE International Pulsed Power Conference, Jun. 2007, Albuquerque, New Mexico.

Paper—Evans, "High Energy Density Electrolytic-Electrochemical Hybrid Capacitor," Presented to the $14^{th}$ Capacitor and Resistor Technology Symposium, Mar. 22, 1994, and published in CARTS '94 Proceedings, 6 pages.

Paper—Evans et al., "Performance of Mil-Type Hybrid Tantalum Capacitors," Presented at the $15^{th}$ Capacitor and Resistor Technology Symposium (CARTS), Mar. 13-16, 1996, 9 pages.

Paper—Freeman at al., "Reliability and Critical Applications of Tantalum Capacitors," 2007 Electronics Components, Assemblies, and Materials Association, Arlington, VA, USA, Proceedings CARTS Europe 2007 Symposium, Oct.-Nov. 2007, Barcelona, Spain, pp. 193-204.

Paper—Merker et al., "New Conducting Polymer Dispersions for Solid Electrolytic Capacitors," CARTS Europe 2005, Oct. 17-20, 2005, Prague, CZ Republic, 6 pages.

Paper—Marker et al., "Tuning Conducting Polymer Dispersions for High-CV Tantalum Capacitors," CARTS Europe Oct. 29-Nov. 1, 2007, Barcelona, Spain, 6 pages.

Paper—Rudge at al., "Conducting Polymers as Active Materials in Electrochemical Capacitors," Dec. 1993, 38 pages.

Paper—Rudge et al., "Scheme for the Use of Conducting Polymers as Active Materials in Electrochemical Supercapacitors," 1993, 12 pages.

Paper—Sautter, Baytron® and Ampertron®: Conductive and Semiconductive Materials for OLED and Organic Electronics Applications, Dec. 17, 2007, 33 pages.

Related Application Form.

GB Search Report for GB1117850.6 dated Feb. 17, 2012, 3 pages.

* cited by examiner

HERMETICALLY SEALED WET ELECTROLYTIC CAPACITOR

BACKGROUND OF THE INVENTION

Electrolytic capacitors typically have a larger capacitance per unit volume than certain other types of capacitors, making them valuable in relatively high-current and low-frequency electrical circuits. One type of capacitor that has been developed is a "wet" electrolytic capacitor that includes a sintered tantalum powder anode. These tantalum "slugs" have very large internal surface area. These tantalum slugs first undergo an electrochemical oxidation that forms an oxide layer coating acting as dielectric over the entire external and internal surfaces of the tantalum body. The anodized tantalum slugs are then sealed in cans containing a highly conductive and generally corrosive liquid electrolyte solution, having high surface area with conductive linings allowing the flow of the current to the liquid electrolyte solution. Unfortunately, such wet capacitors can experience problems when the liquid electrolyte leaks. For example, gases (e.g., hydrogen) may be evolved during operation, causing pressure to build inside the capacitor. This may cause leaks to occur around conventional non-hermetic polymeric seals, where terminal wires protrude from the capacitor casing.

In light of the above, a gas-tight hermetic seal (e.g., glass-to-metal seal) is often employed through which the terminal wire can safely extend. Still, the hermetic seal itself can sometimes become corroded by the liquid electrolyte. For this reason, a liquid seal is also generally employed to prevent exposure of the inner region of the hermetic seal to the electrolyte. U.S. Pat. No. 7,206,186 to Knight, et al., for instance, describes a liquid seal that is formed by compressing elastomeric rings between the underside of the lid and a terminal plate connected to the capacitor element. A bushing may also be positioned inside the elastomeric rings to center the rings relative to the hermetic seal. Despite attempts at improving the liquid sealing of such electrolytic capacitors, problems nevertheless remain. For example, even when liquid seals are used, a small amount of the electrolyte can sometimes still leak through and cause a high DC leakage current for the resulting capacitor.

As such, a need still exists for an improved hermetically sealed electrolytic capacitor.

SUMMARY OF THE INVENTION

In accordance with one embodiment of the present invention, a wet electrolytic capacitor is disclosed. The capacitor comprises a casing that defines an opening and a sidewall surrounding an interior, wherein an electrochemically active cathode material is located on at least a portion of the sidewall. An anode is positioned within the interior of the casing. The anode is formed from a porous anode body that contains a dielectric layer, and the anode comprises an anode lead extending therefrom. An electrolyte is in electrical contact with the anode and the electrochemically active material. A lid is sealed to the casing opening that has an upper surface and lower surface, wherein the lower surface faces toward the interior of the casing. The lid defines an internal orifice. A hermetic seal is positioned within the orifice of the lid, the hermetic seal having a lower surface that faces toward the interior of the casing. A liquid seal coats a substantial portion of the inner surface of the lid and the hermetic seal. The liquid seal contains an insulative sealant material.

Other features and aspects of the present invention are described in more detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
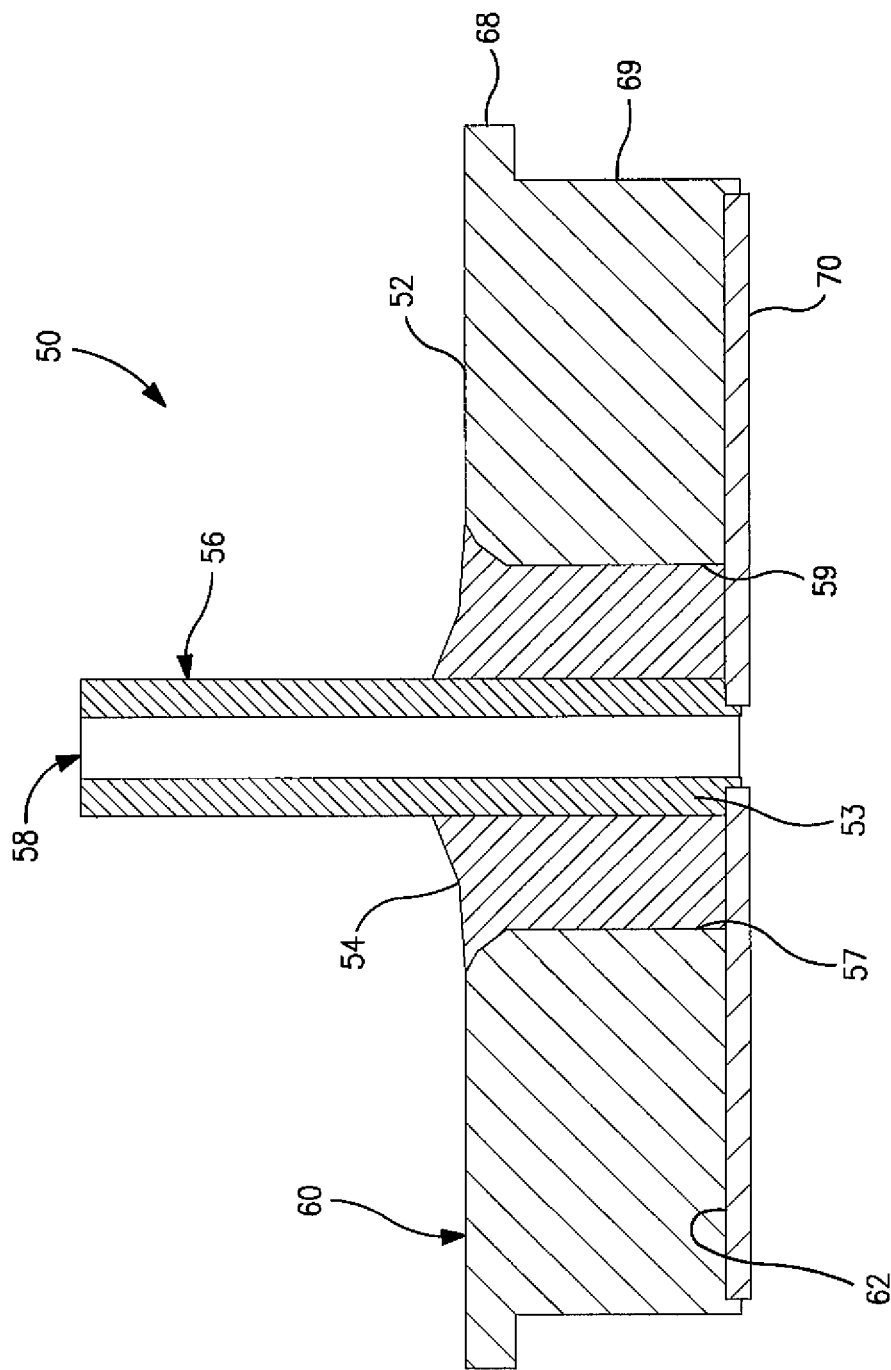
FIG. 1 is a cross-sectional view of one embodiment of the sealed lid assembly that may be used in the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a wet electrolytic capacitor that contains a hermetically sealed lid assembly. More specifically, the lid assembly contains a lid (e.g., titanium) that defines an internal orifice. A conductive tube may extend through the orifice that is of a size and shape sufficient to accommodate an anode lead. An insulative material is also provided within the orifice to form a hermetic seal (e.g., glass-to-metal seal), such as between the conductive tube and the lid. The lid assembly also includes a liquid seal that is formed from a sealant material. The liquid seal coats a substantial portion of the lower surface of the lid and hermetic seal to limit contact with any electrolyte that may leak from the casing. To help achieve such surface coverage, the sealant material is generally flowable so that it can be heated during production of the capacitor and flow into small crevices that would otherwise remains uncoated.

Referring to FIG. 1, for example, one embodiment of a hermetically sealed lid assembly 50 that may be employed in the present invention is shown in more detail. As shown, the lid assembly 50 contains a lid 52 having an upper planar surface 60 spaced from a lower planar surface 62. The lid 52 is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium metals, as well as alloys thereof, are particularly suitable for use in the present invention. In the illustrated embodiment, the lid 52 has a generally cylindrical cross-sectional shape. It should be understood, however, that any geometric configuration may be employed in the present invention, such as D-shaped, rectangular, triangular, prismatic, etc. Between the planar surfaces 60 and 62, the lid 52 has an outer diameter 68 forming a step 69 that leads to an inner diameter portion 69.

The lid 52 defines an internal orifice 59, which may be cylindrical and of a generally constant inside diameter. In the illustrated embodiment, the orifice 59 is defined by a cylindrical sidewall 57 spaced inwardly from the inner diameter portion 69. The sidewall 57 may be formed integral with the lid 52 or from a separate ferrule portion connected to the lid 52. Extending through the orifice 59 is a conductive tube 56 that is generally hollow and of a size and shape sufficient to accommodate an anode lead. The conductive tube 56 is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. An insulative material (e.g., glass) is also provided within the orifice 59 to form a hermetic seal 54 (e.g., glass-to-metal seal) between the conductive tube 56 and the sidewall 57.

As indicated above, the lid assembly 50 also includes a liquid seal 70 that is formed from a generally insulative sealant material. For example, the sealant material typically has an electrical resistance of about $1\times10^2$ Ohm·m or more, in some embodiments about $1\times10^5$ Ohm·m or more, and in some embodiments, from about $1\times10^{15}$ to about $1\times10^{25}$ Ohm·m, determined at a temperature of 20° C. The liquid seal 70 covers at least a portion of the lower surface 62 of the lid 52 to limit its contact with any electrolyte that may leak from the casing. This removes the lid 52 from the circuit and helps improve leakage current. In this regard, the liquid seal 70 may sometimes cover a substantial portion of the lower surface 62 of the lid 52 and the lower surface of the hermetic seal 54. By "substantial portion", it is generally meant that the seal covers about 80% or more of the surface, in some embodiments about 90% or more of the surface, and in some embodiments, about 100% of the surface. As shown in FIG. 1, the liquid seal 70 also typically covers at least a portion of the conductive tube 56, such as a sidewall 53.

To help achieve the desired surface coverage, it is generally desired that the sealant material is flowable so that it can be heated during production of the capacitor and flow into small crevices. The temperature at which the material flows is generally above the operating temperature for which the part is rated so that the seal remains intact during operation. For example, the capacitor may sometimes be rated for operation at temperatures up to about 250° C. In such cases, the sealant material may become flowable at a temperature greater than about 250° C., in some embodiments from about 275° C. to about 350° C., and in some embodiments, from about 285° C. to about 325° C. By "flowable", it is generally understood that the material will have a viscosity of from about $10\times10^5$ to about $10\times10^7$ centipoise. Such flowable materials may be crystalline or semi-crystalline materials that melt or soften at the desired temperature (e.g., polymeric materials), or they may simply be amorphous materials that have a glass transition temperature low enough that the material can flow at the desired temperature. For example, glass materials may be employed, such as glass compositions containing CaO, $Al_2O_3$, $B_2O_3$, SrO, BaO, $La_2O_3$, $SiO_2$, $TiO_2$, $Na_2O$, combinations thereof, etc. Barium lanthanboroate glass compositions, which contain boron oxide ($B_2O_3$), barium oxide (BaO), lanthanum oxide ($LiO_2$) and optionally at least one other oxide, are particularly suitable. Such compositions may be described in more detail in U.S. Pat. Nos. 5,648,302 and 5,104,738, which are incorporated herein in their entirety by reference thereto for all purposes.

Another example of a suitable crystalline or semi-crystalline sealant material for use in the liquid seal 70 is a fluoropolymer. The term fluoropolymer means a hydrocarbon backbone polymer in which some or all of the hydrogen atoms are substituted with fluorine atoms. The backbone polymer is usually polyolefinic and formed from fluorine-substituted, unsaturated olefin monomers. The fluoropolymer can be a homopolymer of such fluorine-substituted monomers or a copolymer of fluorine-substituted monomers or mixtures of fluorine-substituted monomers and non-fluorine-substituted monomers. Along with fluorine atoms, the fluoropolymer can also be substituted with other halogen atoms, such as chlorine and bromine atoms. Representative monomers suitable for forming fluoropolymers for use in this invention are tetrafluoroethylene ("TFE"), vinylidene fluoride ("VF2"), hexafluoropropylene ("HFP"), chlorotrifluoroethylene ("CTFE"), perfluoroethylvinyl ether ("PEVE"), perfluoromethylvinyl ether ("PMVE"), perfluoropropylvinyl ether ("PPVE"), etc., as well as mixtures thereof. Specific examples of suitable fluoropolymers include polytetrafluoroethylene ("PTFE"), perfluoroalkylvinyl ether ("PVE"), poly (tetrafluoroethylene-co-perfluoroalkyvinyl ether) ("PFA"), fluorinated ethylene-propylene copolymer ("FEP"), ethylene-tetrafluoroethylene copolymer ("ETFE"), polyvinylidene fluoride ("PVDF"), polychlorotrifluoroethylene ("PCTFE"), and TFE copolymers with VF2 and/or HFP, etc., as well as mixtures thereof. A particularly suitable fluoropolymer is poly(tetrafluoroethylene-co-perfluoroalkyvinyl ether) ("PFA").

If desired, the liquid seal 70 may be in the form of a laminate that contains layers of different flow properties. For example, the liquid seal 70 may contain a sealant layer that becomes readily flowable at the temperatures indicated above and a generally rigid layer that is not flowable or is flowable only at temperatures higher than the sealant layer. The generally rigid layer may, for instance, become flowable at a temperature that is 5° C. or more, in some embodiments, about 10° C. or more, and in some embodiments, about 20° C. or more than the temperature at which the sealant layer becomes flowable. In one embodiment, for instance, the sealant layer is formed from poly(tetrafluoroethylene-co-perfluoroalkyvinyl ether) ("PFA"), which generally has a melting point of about 305° C., and the generally rigid layer is formed from poly(tetrafluoroethylene) ("PTFE"), which generally has a melting point of about 327° C. Among other things, the generally rigid layer can reduce the likelihood that the sealant layer will flow into undesired areas of the capacitor when heated, and maintain the surface coverage of the lid's inner surface.

For example, the sealant material 70 may be a laminate containing two layers (e.g., sealant layer/rigid layer) in which the sealant layer is positioned directly adjacent to the lid 52. In this manner, the sealant layer is able readily flow and coat the lower surfaces of the lid and the hermetic seal, but the rigid layer can limit its ability to pass into the casing. In other embodiments, the sealant material 70 may be a laminate containing three layers (e.g., sealant layer/rigid layer/sealant layer) in which the sealant layers are positioned adjacent to the lid 52 and the anode. Among other things, this allows the sealant material 70 to be readily applied to the lid 52 and/or the anode during manufacture of the capacitor.

The lid assembly of the present invention, such as described above, may generally be incorporated into a wet electrolytic capacitor using any of a variety of techniques known in the art. In this regard, FIGS. 2-6 illustrate one particular embodiment of a method for forming a capacitor 10 in accordance with the present invention.

Figure 2:
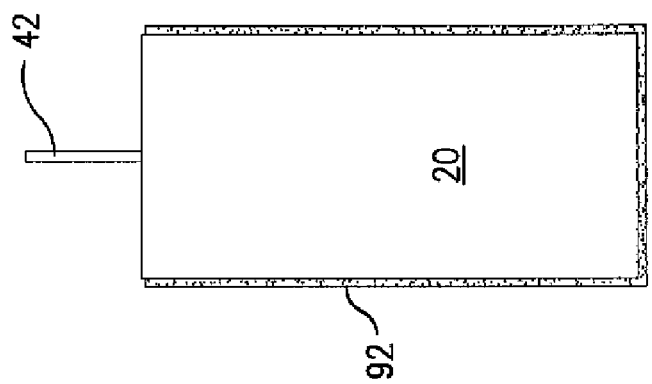
FIG. 2 is a cross-sectional view of an anode that may be employed in one embodiment of the present invention.

Referring to FIG. 2, for instance, an anode 20 is shown that is formed from a porous body of a valve metal composition. The specific charge of the composition may vary, such as from about 2,000 μF*V/g to about 80,000 μF*V/g, in some embodiments from about 5,000 μF*V/g to about 40,000 μF*V/g or more, and in some embodiments, from about 10,000 to about 20,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode 20. In one embodiment, a tantalum or niobium oxide powder having a certain particle size is first selected. The particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode 20, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression, such as by heating the formed pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The size of the pressed anode 20 may depend in part on the desired size of the metal substrate. In certain embodiments, the length of the anode 20 may range from about 0.5 to about 100 millimeters, in some embodiments from about 1 to about 60 millimeters, and in some embodiments, from about 5 to about 30 millimeters. The width (or diameter) of the anode 20 may also range from about 0.5 to about 50 millimeters, in some embodiments from about 1 to about 40 millimeters, and in some embodiments, from about 4 to about 30 millimeters. The shape of the anode 20 may also be selected to improve the electrical properties of the resulting capacitor. For example, the anode body may have a shape that is cylindrical, rectangular, D-shaped, curved, etc.

The anode 20 may also contain a lead 42 formed from any electrically conductive material, such as tantalum, niobium, nickel, aluminum, hafnium, titanium, etc., as well as oxides and/or nitrides of thereof. In certain embodiments, electrical contact with the anode 20 may be accomplished by electrically coupling the lead 42 by resistance or laser welding. Alternatively, the lead 42 may simply be embedded within the powder before the anode is formed.

The anode 20 is typically anodically oxidized ("anodized") so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

An electrolyte (not shown) may also be impregnated within the anode 20, or it may be added to the capacitor at a later stage of production. The electrolyte is the material that provides the connecting path between the anode and cathode. Various suitable electrolytes are described in U.S. Pat. Nos. 5,369,547 and 6,594,140 to Evans, et al., which are incorporated herein their entirety by reference thereto for all purposes. Typically, the electrolyte is ionically conductive in that has an ionic conductivity of from about 0.5 to about 100 milliSiemens per centimeter ("mS/cm"), in some embodiments from about 1 to about 80 mS/cm, in some embodiments from about 5 mS/cm to about 60 mS/cm, and in some embodiments, from about 10 to about 40 mS/cm, determined at a temperature of 25° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The electrolyte is generally in the form of a liquid, such as a solution (e.g., aqueous or non-aqueous), dispersion, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, meso-tartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. One or more pH adjusters (e.g., acids, bases, etc.) may be employed to help achieve the desired pH. In one embodiment, an acid is employed to lower the pH to the desired range. Suitable acids include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

If desired, a separator 92 may also be positioned adjacent to the anode 20 to prevent direct contact between the anode and cathode, yet permit ionic current flow of the electrolyte to the electrodes. Examples of suitable materials for this purpose include, for instance, porous polymer materials (e.g., polypropylene, polyethylene, polycarbonate, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. Although preventing direct contact between the anode and cathode, the separator permits ionic current flow of the electrolyte to the electrodes.

Figure 3:
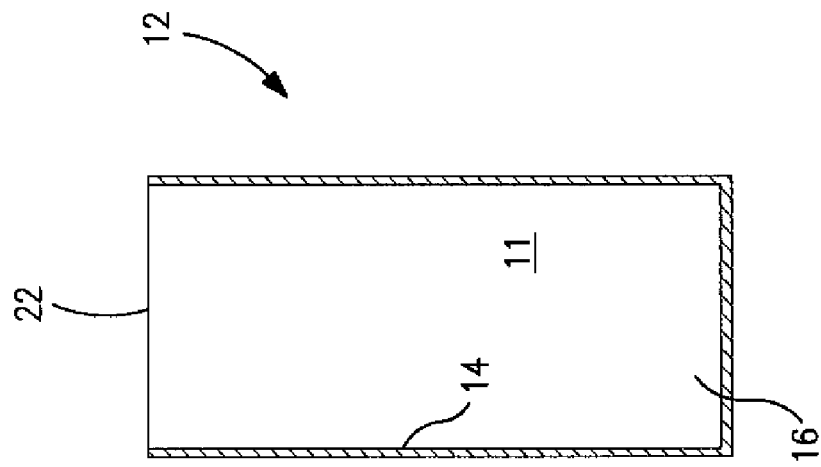
FIG. 3 is a cross-sectional view of one embodiment of a casing coated with an electrochemically active cathode material that may be used in the present invention.
Figure 4:
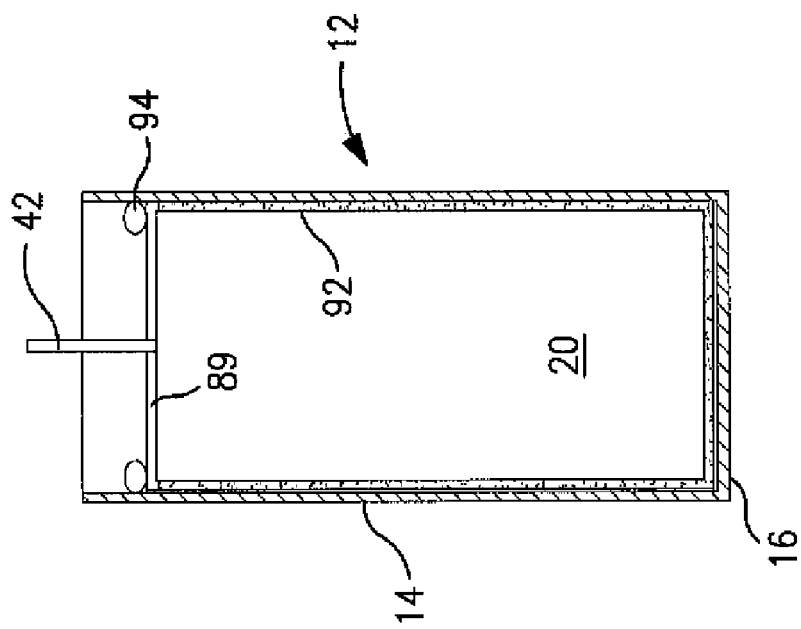
FIG. 4 shows the anode of FIG. 2 positioned within the casing of FIG. 3.

Referring to FIGS. 3-4, the anode 20 may be positioned within an interior 11 of a casing 12. The casing 12 is generally formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Desirably, the casing 12 and the lid 52 are formed from the same materials, such as titanium metals or alloys thereof. In the illustrated embodiment, the casing 12 has a cylindrical shape. It should be understood, however, that any geometric configuration may be employed in the present invention, such as D-shaped, rectangular, triangular, prismatic, etc.

The casing 12 of FIG. 1 contains a sidewall 14 and a lower wall 16. Multiple sidewalls may be employed in such embodiments where the casing is not cylindrical. Regardless, the sidewall 14 and/or lower wall 16 may optionally roughened to increase its surface area. Various techniques may be employed to accomplish such surface roughening, such as mechanical techniques (e.g., sandpaper, sandblasting, etc.); chemical etching; spark anodization, such as described in U.S. application Ser. Nos. 12/330,943 to Dreissig, et al. and 12/209,588 to Ning, et al.; and so forth.

An electrochemically-active cathode material (not shown) is also applied to at least a portion of the casing 12 to increase the effective surface area. For example, the cathode material may be disposed on the inner surfaces of the sidewall 14 and the lower wall 16. One suitable cathode material is a conductive polymer, such as those that are π-conjugated and have electrical conductivity after oxidation or reduction (e.g., electrical conductivity of at least about 1 µS cm$^{-1}$ after oxidation). Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly(3,4-ethylenedioxythiophene) ("PEDT"). In one particular embodiment, a polythiophene derivative is employed with recurring units of general formula (I) or formula (II) or recurring units of general formulae (I) and (II):

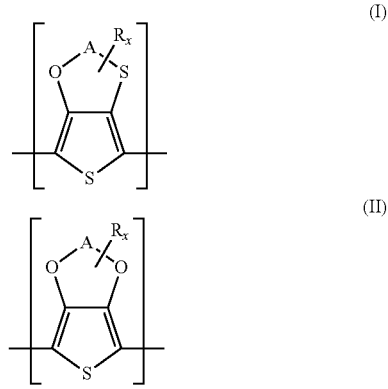

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.);

optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable polythiophene derivatives are those in which "A" is an optionally substituted $C_2$ to $C_3$ alkylene radical and x is 0 or 1. In one particular embodiment, the polythiophene derivative is PEDT and has recurring units of formula (II), wherein "A" is $CH_2$—$CH_2$ and "x" is 0. Methods for forming such polythiophene derivatives are well known in the art and described, for instance, in U.S. Pat. No. 6,987,663 to Merker, et al., which is incorporated herein in its entirety by reference thereto for all purposes. For example, the polythiophene derivatives may be formed from a monomeric precursor, such as optionally substituted thiophenes. Particularly suitable monomeric precursors are substituted 3,4-alkylenedioxythiophenes having the general formula (III), (IV) or a mixture of thiophene of general formulae (III) and (IV):

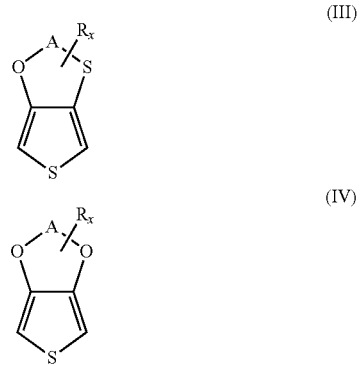

wherein, A, R, and X are as defined above.

Examples of such monomeric precursors include, for instance, optionally substituted 3,4-ethylenedioxythiophenes. Derivatives of these monomeric precursors may also be employed that are, for example, dimers or trimers of the above monomeric precursors. Higher molecular derivatives, i.e., tetramers, pentamers, etc. of the monomeric precursors are suitable for use in the present invention. The derivatives may be made up of identical or different monomer units and used in pure form and in a mixture with one another and/or with the monomeric precursors. Oxidized or reduced forms of these precursors may also be employed.

To produce the desired conductive polymer, monomeric precursors, such as described above, typically undergo oxidative polymerization in the presence of an oxidizing agent. The oxidizing agent may be a transition metal salt, such as a salt of an inorganic or organic acid that contain iron(III), copper(II), chromium(VI), cerium(IV), manganese(IV), manganese(VII), or ruthenium(III) cations. Particularly suitable transition metal salts include iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable for use in the present invention.

In some cases, the conductive polymer material may be in the form of a dispersion of particles having a relatively small size, such as an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form is typically enhanced by using a separate counterion to counteract a charged conductive polymer (e.g., polythiophene). That is, the conductive polymer (e.g., polythiophene or derivative thereof) used in the coating typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the coating is typically from about 0.5:1 to about 50:1, in some embodiments from about 1:1 to about 30:1, and in some embodiments, from about 2:1 to about 20:1. The weight of the electrically conductive polymers referred to above may refer to the weighed-in portion of the monomers used, assuming that a complete conversion occurs during polymerization.

In addition to or in lieu of conductive polymers, metals, such as metal particles formed from ruthenium, iridium, nickel, rhodium, rhenium, cobalt, tungsten, manganese, tantalum, niobium, molybdenum, lead, titanium, platinum, palladium, and osmium, as well as combinations of these metals, may also be employed as the electrochemically active cathode material. In one particular embodiment, for example, the electrochemically-active material includes palladium particles. Non-insulating oxide particles may also be employed in the present invention. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. Nos. 5,726,118 to Ivey, et al.; 5,858,911 to Wellen, et al.; as well as U.S. Patent Application Publication No. 2003/0158342 to Shinozaki, et al., all of which are incorporated herein in their entirety by reference thereto for all purposes.

The cathode material may be applied to the casing 12 using a variety of known techniques, such as by dipping, spin coating, impregnation, pouring, dropwise application, injection, spraying, doctor blading, brushing or printing (e.g., ink-jet, screen, or pad printing). Although it may vary depending on the application technique employed, the viscosity of the cathode material is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and washed. Drying may be performed at temperatures of from about −10° C. to about 250° C., and in some embodiments, from about 0° C. to about 200° C. The resulting dried coating may have a thickness of from about 0.2 micrometers ("µm") to about 100 µm, in some embodiments from about 1 µm to about 40 µm, and in some embodiments, from about 3 µm to about 10 µm. It should be understood that the thickness of the coating is not necessarily the same at all locations on the casing 12.

In addition to the liquid seal 70 discussed above, the capacitor of the present invention may also contain one or more secondary liquid seals. Referring again to FIG. 4, for example, a gasket 89 is shown that is located adjacent to an upper surface of the anode 20. The gasket 89 generally has a cylindrical shape and contains a bore coaxially located therein through which the anode lead 42 can extend. The gasket 89 may be formed from any of a variety of insulative materials, such as described above (e.g., PTFE). Elastomeric rings 94 may also be employed as an additional liquid seal. If desired, the rings 94 may be positioned adjacent to the sidewall 14 of the casing 12 and thereby and help inhibit leakage of the electrolyte therethrough. The elastomeric rings 94 may be formed from an elastomer that is resistant to corrosion by the electrolyte and has sufficient dielectric strength to withstand the maximum voltage generated by the capacitor. In one embodiment, the elastomer can perform over a temperature range of about −55° C. to about 200° C. without degradation or loss of elasticity. Examples of elastomers that may be employed include butyl rubber, chlorobutyl rubber, ethylene propylene rubber (EPR), ethylene propylene diene rubber (EPDM), fluoroelastomers, such as VITON™, polytetrafluoroethylene, polychloroprene rubber, butadiene rubber, nitrile rubber, isoprene rubber, silicone rubber and styrene butadiene rubber.

Figure 5:
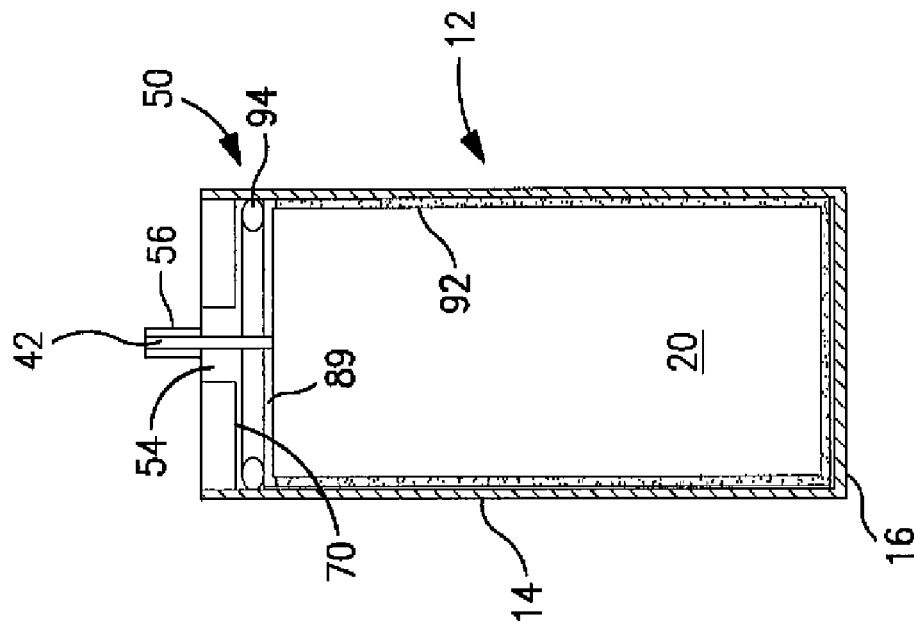
FIG. 5 shows the lid assembly of FIG. 1 positioned over the casing of FIG. 4.
Figure 6:
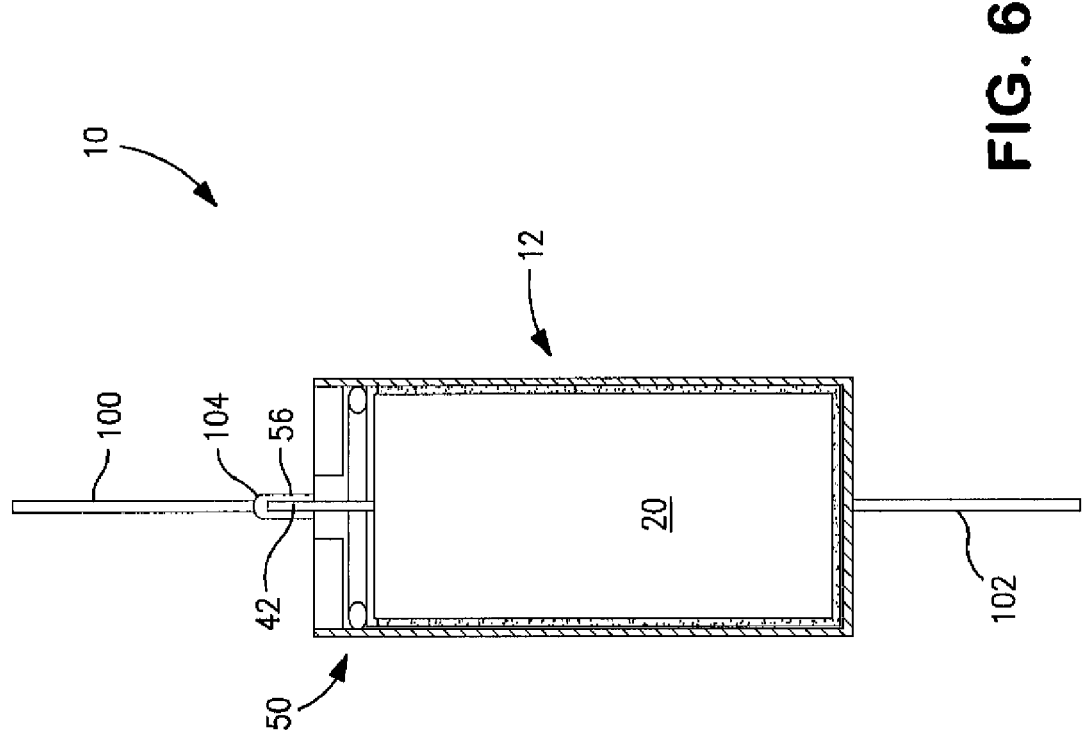
FIG. 6 is a cross-sectional view of one embodiment of a wet electrolytic capacitor of the present invention.

One embodiment for attaching the lid assembly 50 to the casing 12 is shown in FIG. 5. As illustrated, the lid assembly 50 is positioned such that the liquid seal 70 is adjacent to the elastomeric rings 94. Once in the desired position, pressure may be applied to the assembly 50 to compress the elastomeric rings 94 and create a secondary liquid seal. By way of example, the elastomeric rings may be compressed to about 30% to about 85% of their original thickness. Thereafter, the lid 52 is welded to the sidewalls of the casing 12. Referring to FIG. 6, the anode lead 42 extends through the conductive tube 56 and is sealed thereto at the outer end by a weld joint 104. An external positive lead 100, preferably of nickel, may likewise be welded at the weld joint 104. Similarly, an external negative lead 102 may be welded to the bottom of the casing 12.

The resulting capacitor of the present invention may exhibit excellent electrical properties. For example, the capacitor may exhibit a high energy density that enables it suitable for use in high pulse applications. Energy density is generally determined according to the equation $E=1/2*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz and a temperature of 25° C. For example, the capacitor may exhibit an energy density of about 2.0 joules per cubic centimeter (J/cm$^3$) or more, in some embodiments about 3.0 J/cm$^3$, in some embodiments from about 4.0 J/cm$^3$ to about 10.0 J/cm$^3$, and in some embodiments, from about 4.5 to about 8.0 J/cm$^3$. The capacitance may likewise be about 1 milliFarad per square centimeter ("mF/cm$^2$") or more, in some embodiments about 2 mF/cm$^2$ or more, in some embodiments from about 5 to about 50 mF/cm$^2$, and in some embodiments, from about 8 to about 20 mF/cm$^2$.

The equivalent series resistance ("ESR")—the extent that the capacitor acts like a resistor when charging and discharging in an electronic circuit—may also be less than about 15,000 milliohms, in some embodiments less than about 10,000 milliohms, in some embodiments less than about 5,000 milliohms, and in some embodiments, from about 1 to about 1,000 milliohms, measured with a 2-volt bias and 1-volt signal at a frequency of 1000 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 µA/µF*V, in some embodiments less than about 0.5 µA/µF*V, and in some embodiments, less than about 0.1 µA/µF*V, where µA is microamps and µF*V is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.). Likewise, the capacitance may be about 1 milliFarad per square centimeter ("mF/cm$^2$") or more, in some embodiments about 2 mF/cm$^2$ or more, in some embodiments from about 5 to about 50 mF/cm$^2$, and in some embodiments, from about 8 to about 20 mF/cm$^2$.

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 900 Volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following example.

EXAMPLE 1

Figure 8:
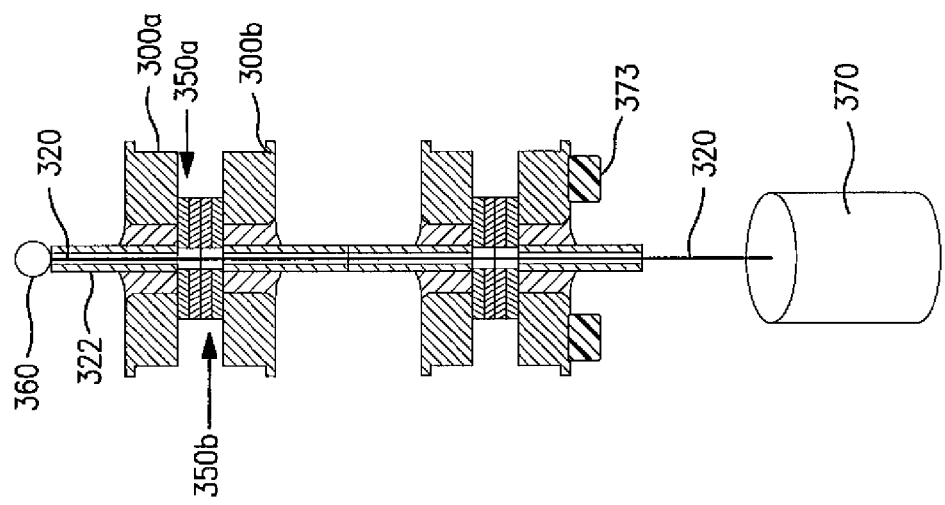
FIG. 8 illustrates the manner in which the capacitor of Example 1 was made.
Figure 7:
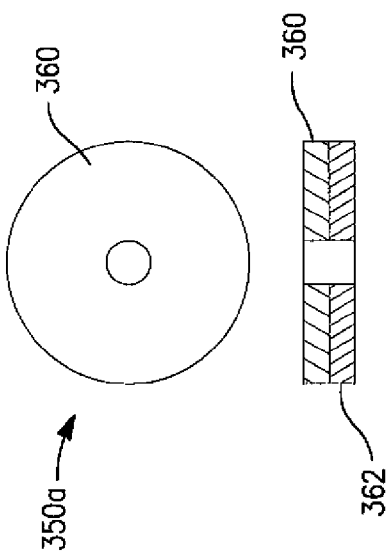
FIG. 7 shows the liquid seal employed in Example 1.

A wet electrolytic capacitor was formed in accordance with the present invention. A liquid seal was initially formed in the manner shown in FIGS. 7-8. More particularly, a glass-to-metal seal 300*a* was threaded onto a wire 320 through a tantalum tube 322, with the top of the tube resting against a bead 380 at the end of the wire. A first perform 350*a* containing a PFA layer 360 and a PTFE layer 362 (obtained from Electrolock) was then positioned over the wire 320 and on the seal 300, with the PFA layer 360 against the seal 300*a*. Another preform 350*b* was also placed on the wire 320 such that the PTFA layers of each preform mated together. A second glass-metal seal 300*b* was threaded onto the wire 320, upside down relative to the first. Additional pairs were positioned in the same way until a manageable stack was obtained. A weight 370 (25-50 grams) was attached to the wire 320, and the entire assembly was then placed in an oven using a fork-like support 373 on the bottom of the stack. The oven was raised to 330° C. and held for a period of 15 to 30 minutes, at which time the oven is turned off. When cooled, the stack was removed and disassembled such that the individual seals were accessible and contained a fluorocarbon disk laminated to the tantalum-glass-metal portion.

A tantalum anode was then placed in a titanium metal case coated with PEDT and containing appropriate separators (e.g., Pureflo 50, Hanes Eng. Materials), the electrolyte dispensed, and the initial seal installed. In some cases, the can was crimped against the initial seal. The glass-metal seal was then threaded over the anode lead, and the circumference welded (e.g., laser welded). The center tantalum wire was cut flush with the end of the tantalum tube, and the tube-riser wire was welded (e.g., laser welded). Plated nickel leads were then resistance welded to the tantalum fused end and the bottom of the metal can.

EXAMPLE 2

Figure 10:
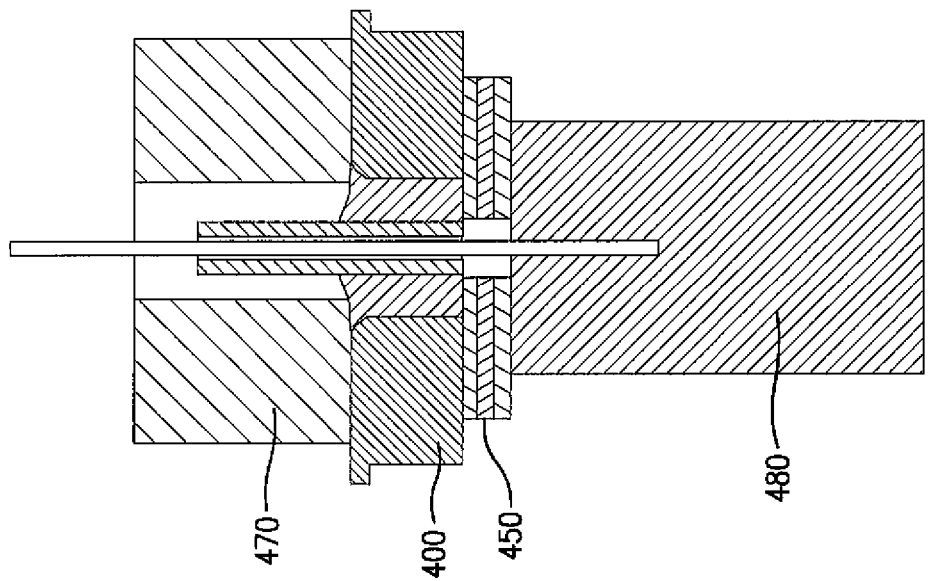
FIG. 10 illustrates the manner in which the capacitor of Example 2 was made.
Figure 9:
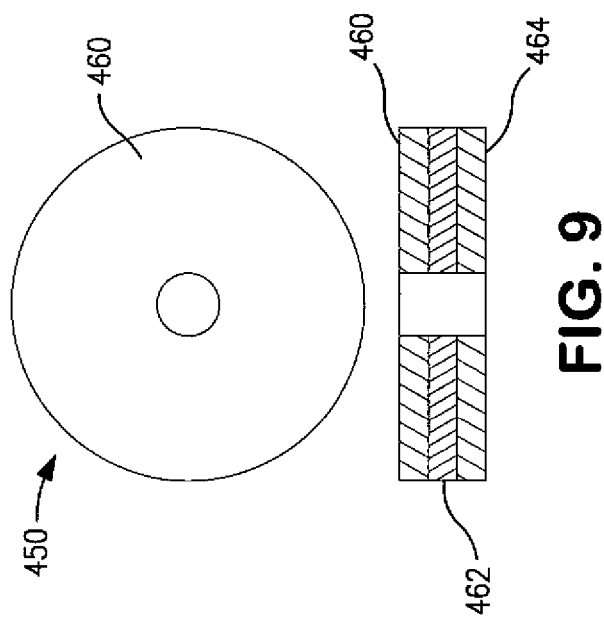
FIG. 9 shows the liquid seal employed in Example 2.

A wet electrolytic capacitor was formed in accordance with the present invention. A liquid seal was initially formed in the manner shown in FIGS. 9-10. More particularly, a glass-to-metal seal 400 was threaded onto a wire through a tantalum tube. A preform 450 containing a PFA layer 460, PTFE layer 462, and PFA layer 464 (obtained from Electrolock) was then positioned over the wire 420 and on the seal 400, with the PFA layer 460 against the seal 400. A weight 470 (10 grams) was attached to the wire 420, and the entire assembly was then placed in an oven. The oven was raised to 330° C. and held for a period of 15 to 30 minutes, at which time the oven is turned off. When cooled, the stack was removed and disassembled such that the individual seals were accessible and contained a fluorocarbon disk laminated to the tantalum-glass-metal portion. The resulting seal was then assembled with a tantalum anode 480, metal casing (not shown), and electrolyte in the manner described in Example 1.

EXAMPLE 3

Figure 11:
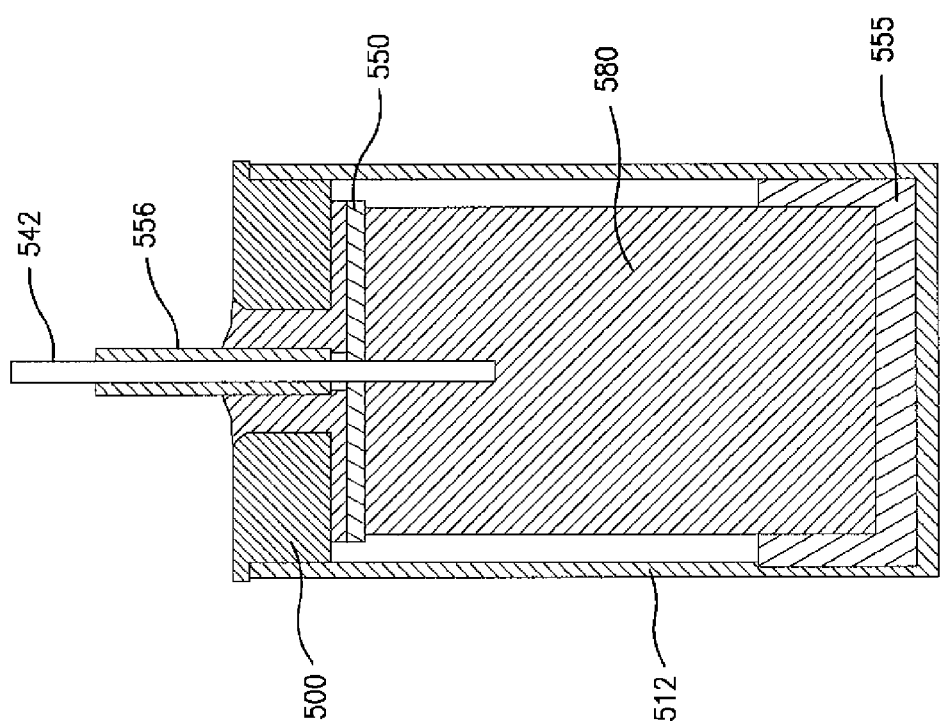
FIG. 11 shows the capacitor made in Example 3.

A wet electrolytic capacitor was formed in accordance with the present invention. As shown in FIG. 11, a disk of a single PFA layer 550 was threaded onto a formed anode riser wire 542, and then the anode riser wire was inserted into the tube 556. The seal 500, disk 550, and anode 580 were then placed in an oven at 333° C. upside down, so the weight of the anode compressed the PFA disk. The assembly was held at temperature for ½ hour, and then cooled. The assembly was then placed into a metal case 512, into which an amount of electrolyte had been introduced, and a Teflon support 555 had been placed. The seal was pressed into the can, and the circumference welded. The center tube was sealed with a laser, and the leads attached in the manner known to the art.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   a casing that defines an opening and a sidewall surrounding an interior, wherein an electrochemically active cathode material is located on at least a portion of the sidewall;
   an anode positioned within the interior of the casing, wherein the anode is formed from a porous anode body that contains a dielectric layer, the anode comprising an anode lead extending therefrom;
   an electrolyte that is in electrical contact with the anode and the electrochemically active material;
   a lid sealed to the casing opening that has an upper surface and lower surface, wherein the lower surface faces toward the interior of the casing, wherein the lid further defines an internal orifice;
   a hermetic seal positioned within the orifice of the lid, the hermetic seal having a lower surface that faces toward the interior of the casing; and
   a liquid seal that coats a substantial portion of the inner surface of the lid and the hermetic seal, wherein the liquid seal contains an insulative sealant material.

2. The wet electrolytic capacitor of claim 1, wherein the sealant material is flowable at a temperature of greater than about 250° C.

3. The wet electrolytic capacitor of claim 1, wherein the sealant material is flowable at a temperature of from about 285° C. to about 325° C.

4. The wet electrolytic capacitor of claim 1, wherein the sealant material includes a fluoropolymer.

5. The wet electrolytic capacitor of claim 4, wherein the fluoropolymer is poly(tetrafluoroethylene-co-perfluoroalkylvinyl ether).

6. The wet electrolytic capacitor of claim 1, wherein the liquid seal is a laminate that contains a sealant layer and a generally rigid layer, wherein the sealant layer contains the sealant material.

7. The wet electrolytic capacitor of claim 6, wherein the generally rigid layer becomes flowable at a temperature that is about 10° C. or more than the temperature at which the sealant layer becomes flowable.

8. The wet electrolytic capacitor of claim 6, wherein the sealant layer includes poly(tetrafluoroethylene-co-perfluoroalkyvinyl ether) and the generally rigid layer includes poly(tetrafluoroethylene).

9. The wet electrolytic capacitor of claim 1, wherein the sealant material includes a glass composition.

10. The wet electrolytic capacitor of claim 1, wherein the liquid seal covers about 90% or more of the lower surface of the lid and about 90% or more of the lower surface of the hermetic seal.

11. The wet electrolytic capacitor of claim 1, where a conductive tube is positioned within the orifice of the lid, wherein the anode lead extends through the conductive tube and the hermetic seal electrically insulates the conductive tube.

12. The wet electrolytic capacitor of claim 11, wherein the liquid seal covers at least a portion of the conductive tube.

13. The wet electrolytic capacitor of claim 11, wherein the conductive tube contains tantalum or an alloy thereof.

14. The wet electrolytic capacitor of claim 1, wherein both the lid and the casing contain titanium or an alloy thereof.

15. The wet electrolytic capacitor of claim 1, wherein both the lid and the casing have a generally cylindrical cross-sectional shape.

16. The wet electrolytic capacitor of claim 15, wherein the conductive polymer is poly(3,4-ethylenedioxythiophene).

17. The wet electrolytic capacitor of claim 1, wherein the electrochemically active cathode material includes a conductive polymer.

18. The wet electrolytic capacitor of claim 1, wherein the anode body includes tantalum, niobium, or an electrically conductive oxide thereof.

19. The wet electrolytic capacitor of claim 1, wherein the electrolyte is aqueous.

20. The wet electrolytic capacitor of claim 1, further comprising a separator that surrounds at least a portion of the anode.

21. The wet electrolytic capacitor of claim 1, further comprising a gasket that is located adjacent to an upper surface of the anode, the gasket being formed from an insulative material.

22. The wet electrolytic capacitor of claim 1, further comprising elastomeric rings positioned adjacent to the sidewall of the casing.

23. The wet electrolytic capacitor of claim 1, further comprising an external positive lead that is sealed to an end of the conductive tube and an external negative lead that is sealed to a lower wall of the casing.

24. A wet electrolytic capacitor comprising:
   a generally cylindrical metal casing that defines an opening and a sidewall surrounding an interior, wherein an electrochemically active cathode material is located on at least a portion of the sidewall;
   an anode positioned within the interior of the casing, wherein the anode is formed from a porous anode body that contains a dielectric layer, wherein the anode body includes tantalum, niobium, or an electrically conductive oxide thereof, the anode comprising an anode lead extending therefrom;
   a liquid electrolyte that is in electrical contact with the anode and the electrochemically active material;
   a generally cylindrical lid sealed to the casing opening that has an upper surface and lower surface, wherein the lower surface faces toward the interior of the casing, wherein the lid further defines an internal orifice;
   a conductive metal tube positioned within the orifice of the lid, wherein the anode lead extends through the conductive metal tube,
   a hermetic seal that is positioned within the orifice of the lid and electrically insulates the conductive tube, the hermetic seal having a lower surface that faces toward the interior of the casing; and
   a liquid seal that coats a substantial portion of the inner surface of the lid and the hermetic seal, wherein the liquid seal contains an insulative sealant material.

25. The wet electrolytic capacitor of claim 24, wherein the sealant material is flowable at a temperature of from about 285° C. to about 325° C.

26. The wet electrolytic capacitor of claim 24, wherein the sealant material includes a fluoropolymer.

27. The wet electrolytic capacitor of claim 25, wherein the fluoropolymer is poly(tetrafluoroethylene-co-perfluoroalkylvinyl ether).

28. The wet electrolytic capacitor of claim 24, wherein the liquid seal is a laminate that contains a sealant layer and a generally rigid layer, wherein the sealant layer contains the sealant material.

29. The wet electrolytic capacitor of claim 28, wherein the generally rigid layer becomes flowable at a temperature that is about 10° C. or more than the temperature at which the sealant layer becomes flowable.

30. The wet electrolytic capacitor of claim 29, wherein the sealant layer includes poly(tetrafluoroethylene-co-perfluoroalkyvinyl ether) and the generally rigid layer includes poly(tetrafluoroethylene).

31. The wet electrolytic capacitor of claim 24, wherein the sealant material includes a glass.

32. The wet electrolytic capacitor of claim 24, wherein the liquid seal covers about 90% or more of the lower surface of the lid and about 90% or more of the lower surface of the hermetic seal.

33. The wet electrolytic capacitor of claim 24, wherein the liquid seal covers at least a portion of the conductive tube.

34. The wet electrolytic capacitor of claim 24, wherein the electrochemically active cathode material includes a conductive polymer.

35. The wet electrolytic capacitor of claim 34, wherein the conductive polymer is poly(3,4-ethylenedioxythiophene).

36. The wet electrolytic capacitor of claim 24, further comprising:
- a gasket that is located adjacent to an upper surface of the anode, the gasket being formed from an insulative material; and
- elastomeric rings positioned adjacent to the sidewall of the casing.

* * * * *

UNITED STATES PATENT AND TRADEMARK OFFICE
CERTIFICATE OF CORRECTION

| | |
|---|---|
| PATENT NO. | : 8,259,435 B2 |
| APPLICATION NO. | : 12/916794 |
| DATED | : September 4, 2012 |
| INVENTOR(S) | : William A. Millman et al. |

Page 1 of 1

It is certified that error appears in the above-identified patent and that said Letters Patent is hereby corrected as shown below:

In the Abstract:

"... and flow into small crevices that would otherwise remains uncoated." should read --... and flow into small crevices that would otherwise remain uncoated.--

Under References Cited:

"6,184,150 B1 2/2001 Yang et al." should read --6,184,160 B1 2/2001 Yan et al.--

Under Other Publications:

"Paper–Marker et al., "Tuning Conducting ..."" should read
--Paper–Merker et al., "Tuning Conducting ...--

Signed and Sealed this
Fifth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO.       : 8,259,435 B2
APPLICATION NO.  : 12/916794
DATED            : September 4, 2012
INVENTOR(S)      : William A. Millman et al.

It is certified that error appears in the above-identified patent and that said Letters Patent is hereby corrected as shown below:

Title Page, Item (57) In the Abstract, lines 15-16:

"... and flow into small crevices that would otherwise remains uncoated." should read --... and flow into small crevices that would otherwise remain uncoated.--

Under References Cited, U. S. Patent Documents, Page 2, Column 1:

"6,184,150 B1 2/2001 Yang et al." should read --6,184,160 B1 2/2001 Yan et al.--

Under Other Publications, Page 3, Column 2:

"Paper–Marker et al., "Tuning Conducting ..." should read
--Paper–Merker et al., "Tuning Conducting ...--

This certificate supersedes the Certificate of Correction issued February 5, 2013.

Signed and Sealed this
Nineteenth Day of March, 2013

Teresa Stanek Rea
*Acting Director of the United States Patent and Trademark Office*